United States Patent
Matsumoto et al.

(10) Patent No.: US 6,474,454 B2
(45) Date of Patent: Nov. 5, 2002

(54) DAMPING FORCE CONTROL TYPE HYDRAULIC SHOCK ABSORBER

(75) Inventors: Takuya Matsumoto, Chiba-ken (JP); Takashi Nezu, Kanagawa-ken (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/866,713

(22) Filed: May 30, 2001

(65) Prior Publication Data

US 2002/0000352 A1 Jan. 3, 2002

(30) Foreign Application Priority Data

May 31, 2000  (JP) ........................................ 2000-163230

(51) Int. Cl.⁷ ............................................... F16F 13/00
(52) U.S. Cl. ................ 188/282.6; 188/319.1; 188/322.15; 267/64.15
(58) Field of Search .................. 188/266.4, 282.4, 188/282.6, 318, 319.1, 322.15; 267/64.15

(56) References Cited

U.S. PATENT DOCUMENTS

| | | | | |
|---|---|---|---|---|
| 5,277,283 A | * | 1/1994 | Yamaoka et al. | 188/266.4 |
| 5,293,971 A | * | 3/1994 | Kanari et al. | 188/282.1 |
| 5,404,973 A | * | 4/1995 | Katoh et al. | 188/266.3 |
| 5,497,862 A | * | 3/1996 | Hoya | 188/266.4 |
| 5,655,633 A | | 8/1997 | Nakadate et al. | |

* cited by examiner

*Primary Examiner*—Jack Lavinder
*Assistant Examiner*—Xuan Lan Nguyen
(74) *Attorney, Agent, or Firm*—Wenderoth, Lind & Ponack, L.L.P.

(57) ABSTRACT

A pilot chamber is formed at the back of a disk valve for each of the fluid flow systems for the extension and compression strokes. Damping force in a low piston speed region is controlled with a pressure control valve. The valve opening pressure of the disk valve is controlled by varying a pilot pressure introduced into the pilot chamber from a cylinder's hydraulic fluid chamber through a cut portion in a piston bolt and an orifice groove formed in a fixed member supporting the disk valve, thereby controlling damping force in a high piston speed region. A sharp pressure change occurring when the stroke direction of a piston rod changes is attenuated by the restricting action of the orifice groove so as not to be readily transmittable to the pilot chamber.

7 Claims, 2 Drawing Sheets

DAMPING FORCE CONTROL TYPE HYDRAULIC SHOCK ABSORBER

BACKGROUND OF THE INVENTION

The present invention relates to a damping force control type hydraulic shock absorber attached to a suspension system of a vehicle, for example, an automobile.

Hydraulic shock absorbers attached to suspension systems of automobiles or other vehicles include damping force control type hydraulic shock absorbers that are designed so that the level of damping force can be properly controlled in accordance with road surface conditions, vehicle running conditions, etc. with a view to improving ride quality and steering stability.

In general, a damping force control type hydraulic shock absorber includes a cylinder having a hydraulic fluid sealed therein. A piston is slidably fitted in the cylinder to divide the inside of the cylinder into two chambers. The piston is connected with a piston rod to form a piston assembly. The piston assembly is provided with a main hydraulic fluid passage and a bypass passage, which provide communication between the two chambers in the cylinder. The main hydraulic fluid passage is provided with a damping force generating mechanism including an orifice and a disk valve. The bypass passage is provided with a damping force control valve for controlling the passage area of the bypass passage.

When the bypass passage is opened through the damping force control valve, the flow resistance to the hydraulic fluid flowing between the two chambers in the cylinder is reduced, thereby reducing damping force. When the bypass passage is closed, the flow resistance between the two chambers is increased, thereby increasing damping force. Thus, damping force characteristics can be appropriately controlled by opening and closing the damping force control valve.

In the above-described damping force control type hydraulic shock absorber, in which damping force is controlled by varying the passage area of the bypass passage, the damping force characteristics can be changed to a considerable extent in a low piston speed region because damping force depends on the restricting action of the orifice in the hydraulic fluid passage. However, the damping force characteristics cannot greatly be changed in intermediate and high piston speed regions because in these regions damping force depends on-the degree of opening of the damping force generating mechanism (disk valve, etc.) in the main hydraulic fluid passage.

To solve the above-described problem, U.S. Pat. No. 5,655,633, for example, discloses a damping force control type hydraulic shock absorber in which a pressure chamber (pilot chamber) is formed at the back of a disk valve serving as a damping force generating mechanism in a main hydraulic fluid passage common to the extension and compression sides. The pressure chamber is communicated with a cylinder chamber on the upstream side of the disk valve through a fixed orifice and also communicated with a cylinder chamber on the downstream side of the disk valve through a variable orifice (flow control valve).

According to the above damping force control type hydraulic shock absorber, the area of the communicating passage between the two chambers in the cylinder is controlled by opening and closing the variable orifice.

Moreover, the valve opening initial pressure of the disk valve can be varied by changing the pressure in the pressure chamber by the pressure loss in the variable orifice. Thus, it is possible to control orifice characteristics (in which damping force is approximately proportional to the square of the piston speed) and valve characteristics (in which damping force is approximately proportional to the piston speed) and hence possible to widen the control range for damping force characteristics.

However, the damping force control type hydraulic shock absorber having a pilot chamber, disclosed in above-mentioned U.S. Patent, suffers from the following problem.

When the direction of stroke of the piston rod changes from the extension side to the compression side or vice versa, the pressure of hydraulic fluid in the cylinder changes sharply, and the change in the pressure is transmitted to the pilot chamber-through the hydraulic fluid passage, causing the valve opening pressure of the disk valve to change. Therefore, it becomes difficult to obtain stable damping force.

SUMMARY OF THE INVENTION

The present invention was made in view of the above-described circumstances.

An object of the present invention is to provide a damping force control type hydraulic shock absorber capable of suppressing the change in the pressure in the pilot chamber when the piston rod stroke direction changes and thus providing stable damping force.

The present invention provides a damping force control type hydraulic shock absorber including a cylinder having a hydraulic fluid sealed therein. A piston is slidably fitted in the cylinder. A piston rod is connected at one end thereof to the piston. The other end of the piston rod extends to the outside of the cylinder. A main passage and a sub-passage are communicably connected to the cylinder to allow the hydraulic fluid to flow therethrough in response to the sliding movement of the piston. A pilot-operated damping valve generates damping force by controlling the flow of the hydraulic fluid in the main passage. A fixed orifice is provided at the upstream side of the sub-passage. A regulating valve is provided at the downstream side of the sub-passage. A pilot passage allows a portion of the sub-passage between the fixed orifice and the regulating valve to communicate with a pilot chamber of the pilot-operated damping valve. A restrictor is provided in the pilot passage.

With this arrangement, damping force is controlled by controlling the flow of the hydraulic fluid in the sub-passage with the regulating valve, and the valve opening pressure of the pilot-operated damping valve is controlled by varying the pilot pressure transmitted to the pilot chamber through the pilot passage. At this time, a change in pressure of the hydraulic fluid transmitted to the pilot chamber through the pilot passage is attenuated by the restrictor.

The above and other objects, features and advantages of the present invention will become more apparent from the following description of the preferred embodiments thereof, taken in conjunction with the accompanying drawings.

DETAILED DESCRIPTION OF THE INVENTION

An embodiment of the present invention will be described below in detail with reference to the accompanying drawings.

Figure 1:
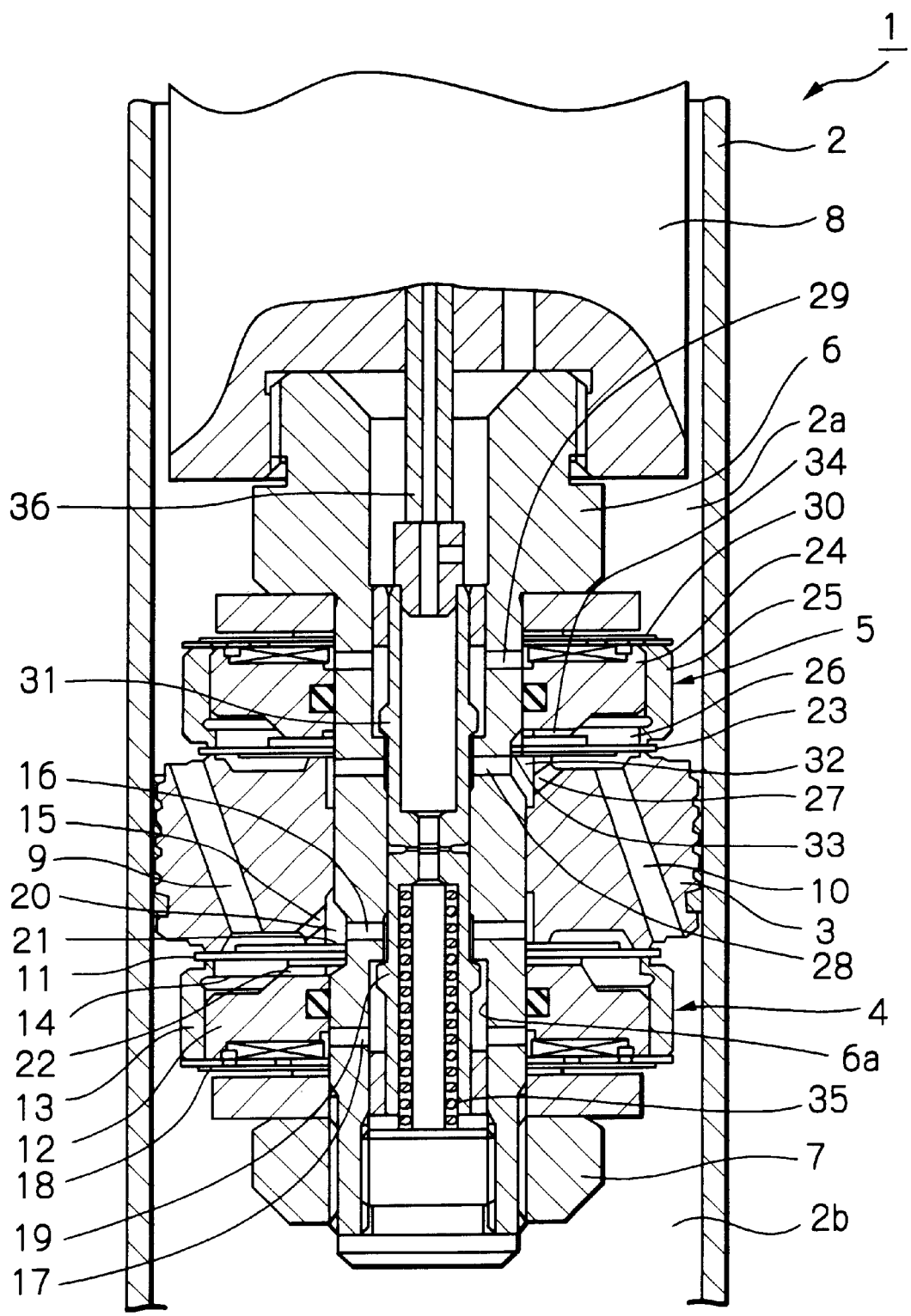
FIG. 1 is a vertical sectional view showing an essential part of a damping force control type hydraulic shock absorber according to an embodiment of the present invention.
Figure 2:
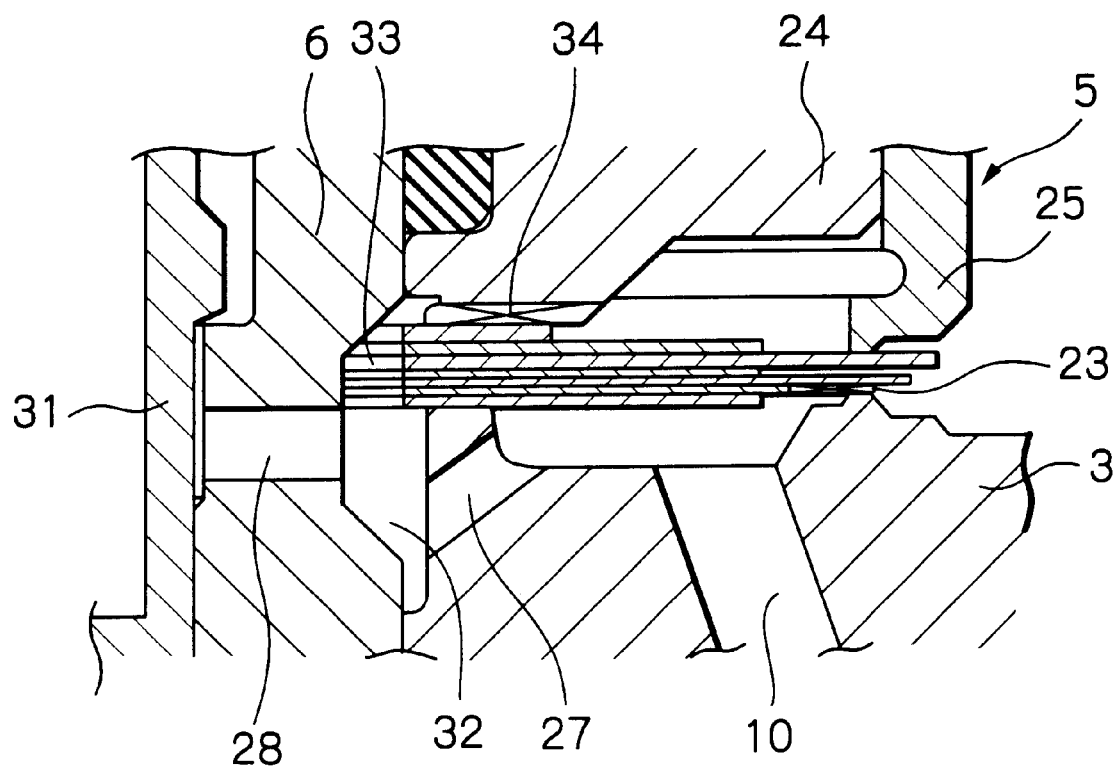
FIG. 2 is an enlarged view of a compression damping force generating mechanism in the hydraulic shock absorber shown in FIG. 1.

As shown in FIGS. 1 and 2, a damping force control type hydraulic shock absorber 1 according to the present invention includes a cylinder 2 having a hydraulic fluid sealed therein. A piston 3 is slidably fitted in the cylinder 2. The piston 3 divides the inside of the cylinder 2 into two chambers, i.e. a cylinder upper chamber 2a and a cylinder lower chamber 2b. Extension and compression damping force generating mechanisms 4 and 5 (described later) are installed on both ends of the piston 3. A piston bolt 6 pierces through the compression damping force generating mechanism 5, the piston 3 and the extension damping force generating mechanism 4 and is secured with a nut 7. One end of a piston rod 8 is connected to the proximal end of the piston bolt 6. The other end portion of the piston rod 8 extends through a rod guide (not shown) and an oil seal (not shown), which are provided at the upper end of the cylinder 2, and projects to the outside of the cylinder 2. A reservoir (not shown) is connected to the cylinder 2 to absorb a volumetric change of the capacity of the cylinder 2 due to extension stroke and compression stroke of the piston rod 8. It should be noted that a combination of the piston rod 8 and the piston bolt 6 connected together is herein referred to as a "piston rod assembly".

The piston 3 is provided with an extension hydraulic fluid passage 9 (main passage) and a compression hydraulic fluid passage 10 (main passage) for communication between the cylinder upper and lower chambers 2a and 2b. During the extension stroke of the piston rod 8, the flow of the hydraulic fluid in the extension hydraulic fluid passage 9 is controlled by the extension damping force generating mechanism 4 to generate damping force. During the compression stroke, the flow of the hydraulic fluid in the compression hydraulic fluid passage 10 is controlled by the compression damping force generating mechanism 5 to generate damping force.

The extension damping force generating mechanism 4 includes a disk valve 11 (valve member of pilot-operated damping valve), a fixed member 12 and a movable member 13. A pilot chamber 14 is formed by the disk valve 11 and the fixed and movable members 12 and 13. The disk valve 11 controls the flow of the hydraulic fluid in the extension hydraulic fluid passage 9 to generate damping force. The pressure in the pilot chamber 14 acts on the back of the disk valve 11 to control the valve opening pressure of the disk valve 11. The extension hydraulic fluid passage 9 is communicated with an axial bore 6a in the piston bolt 6 through an orifice passage 15 (fixed orifice) and a hydraulic fluid passage 16. The extension hydraulic fluid passage 9 is further communicated with the cylinder lower chamber 2b through a hydraulic fluid passage 17 and a check valve 18. The orifice passage 15, the hydraulic fluid passages 16 and 17 and the check valve 18 form an extension sub-passage for allowing the extension hydraulic fluid passage 9 to communicate with the cylinder lower chamber 2b. A pressure control valve 19 (regulating valve) is provided in the axial bore 6a of the piston bolt 6 to control the flow of the hydraulic fluid in the sub-passage.

A portion of the piston bolt 6 is cut at the outer periphery so that a recess is formed to axially extend across the inner edge of the disk valve 11, thereby providing a fluid passage 21 (pilot passage) partially defined by the circular inner circumferential wall of the disk valve. The recess on the outer peripheral portion of the piston bolt 6 provides a hydraulic fluid chamber 20 between the orifice passage 15 and the hydraulic fluid passage 16. The hydraulic fluid chamber 20 is communicated with the pilot chamber 14 through the passage 21 and an orifice groove 22 (restrictor) formed in the fixed member 12.

The flow path area of the orifice groove 22 is set at a value less than the flow path area of the orifice passage 15. Although only one orifice passage 15 and only one orifice groove 22 are provided in this embodiment, the hydraulic shock absorber may be provided with a plurality of orifice passages 15 and a plurality of orifice grooves 22. In such a case, the total flow path area of the orifice grooves 22 is set at a value less than the total flow path area of the orifice passages 15.

In the foregoing arrangement, since the disk valve 11 is mounted on the piston 3, it is not required to provide a bypass passage which is located outside of the cylinder and has a pilot-operated damping valve and consequently, it is possible to make the entire damping force control type hydraulic shock absorber compact.

Furthermore, the fluid passage 21 is formed between the recess in the piston bolt 6 and the disk valve 11. Therefore, it is not required to otherwise provide a pilot passage in the piston bolt 6 by a drilling process. This fact contributes to substantial reduction of manufacturing cost in connection with the pilot passage. Furthermore, consideration of the position of the disk valve 11 relative to the piston bolt 6 in the circumferential direction is not required since the recess is formed in the piston bolt 6. By this fact, assembling process of the damping force control type hydraulic shock absorber is made easy.

The compression damping force generating mechanism 5 includes a disk valve 23 (valve member of pilot-operated damping valve), a fixed member 24 and a movable member 25. A pilot chamber 26 is formed by the disk valve 23 and the fixed and movable members 24 and 25. The disk valve 23 controls the flow of the hydraulic fluid in the compression hydraulic fluid passage 10 to generate damping force. The pressure in the pilot chamber 26 acts on the back of the disk valve 23 to control the valve opening pressure of the disk valve 23. The compression hydraulic fluid passage 10 is communicated with the inside of the piston bolt 6 through an orifice passage 27 (fixed orifice) and a hydraulic fluid passage 28. The compression hydraulic fluid passage 10 is further communicated with the cylinder upper chamber 2a through a hydraulic fluid passage 29 and a check valve 30. The orifice passage 27, the hydraulic fluid passages 28 and 29 and the check valve 30 form a compression sub-passage for allowing the compression hydraulic fluid passage 10 to communicate with the cylinder upper chamber 2a. A pressure control valve 31 (regulating valve) is provided in the axial bore 6a of the piston bolt 6 to control the flow of the hydraulic fluid in the sub-passage.

A portion of the piston bolt 6 is cut at the outer periphery so that a recess is formed to axially extend across the inner edge of the disk valve 23, thereby providing a fluid passage 33 (pilot passage) partially defined by the circular inner circumferential wall of the disk valve. The recess on the outer peripheral portion of the piston bolt 6 provides a hydraulic fluid chamber 32 between the orifice passage 27 and the hydraulic fluid passage 28. The hydraulic fluid chamber 32 is communicated with the pilot chamber 26 through the passage 33 and an orifice groove 34 (restrictor) formed in the fixed member 24.

The flow path area of the orifice groove 34 is set at a value less than the flow path area of the orifice passage 27.

Although only one orifice passage 27 and only one orifice groove 34 are provided in this embodiment, the hydraulic shock absorber may be provided with a plurality of orifice passages 27 and a plurality of orifice grooves 34. In such a case, the total flow path area of the orifice grooves 34 is set at a value less than the total flow path area of the orifice passages 27.

In the foregoing arrangement, since the disk valve 23 is mounted on the piston 3, it is not required to provide a bypass passage which is located outside of the cylinder and has a pilot-operated damping valve and consequently, it is possible to make the entire damping force control type hydraulic shock absorber compact.

Furthermore, the fluid passage 33 is formed between the recess in the piston bolt 6 and the disk valve 23. Therefore, it is not required to otherwise provide a pilot passage in the piston bolt 6 by a drilling process. This fact contributes to substantial reduction of manufacturing cost in connection with the pilot passage. Furthermore, consideration of the position of the disk valve 23 relative to the piston bolt 6 in the circumferential direction is not required since the recess is formed in the piston bolt 6. By this fact, assembling process of the damping force control type hydraulic shock absorber is made easy.

The extension and compression pressure control valves 19 and 31 are slidably fitted in the axial bore 6a of the piston bolt 6 so as to abut on each other. The extension pressure control valve 19 is pressed at the lower end thereof by a return spring 35 (compression spring) so that the upper end of the compression pressure control valve 31 abuts on an actuating rod 36 of a proportional solenoid actuator (not shown) provided in the piston rod 8. Thus, the control pressure attained by the extension and compression pressure control valves 19 and 31 can be controlled by varying the electric current supplied to the proportional solenoid actuator.

The following is a description of the operation of the embodiment arranged as stated above.

During the extension stroke of the piston rod 8, as the piston 3 moves, the hydraulic fluid in the cylinder upper chamber 2a is pressurized. Consequently, before the disk valve 11 of the extension damping force generating mechanism 4 opens (in a low piston speed region), the hydraulic fluid in the cylinder upper chamber 2a flows to the cylinder lower chamber 2b through the extension hydraulic fluid passage 9, the orifice passage 15, the hydraulic fluid chamber 20, the hydraulic fluid passage 16, the pressure control valve 19, the hydraulic fluid passage 17 and the check valve 18. When the pressure in the cylinder upper chamber 2a reaches the valve opening pressure of the disk valve 11 (in a high piston speed region), the disk valve 11 opens to allow the hydraulic fluid in the cylinder upper chamber 2a to flow directly into the cylinder lower chamber 2b through the extension hydraulic fluid passage 9.

Thus, damping force can be controlled directly by controlling the valve opening pressure of the pressure control valve 19, that is, by varying the electric current supplied to the proportional solenoid actuator. At this time, because the pressure on the upstream side of the pressure control valve 19 is transmitted to the pilot chamber 14 through the passage 21 and the orifice groove 22, the valve opening pressure of the disk valve 11 can also be controlled at the same time as the valve opening pressure of the pressure control valve 19 is controlled. Thus, damping forces in the low and high piston speed regions can be controlled simultaneously.

During the compression stroke of the piston rod 8, as the piston 3 moves, the hydraulic fluid in the cylinder lower chamber 2b is pressurized. Before the disk valve 23 of the compression damping force generating mechanism 5 opens (in a low piston speed region), the hydraulic fluid in the cylinder lower chamber 2b flows to the cylinder upper chamber 2a through the compression hydraulic fluid passage 10, the orifice passage 27, the hydraulic fluid chamber 32, the hydraulic fluid passage 28, the pressure control valve 31, the hydraulic fluid passage 29 and the check valve 30. When the pressure in the cylinder lower chamber 2b reaches the valve opening pressure of the disk valve 23 (in a high piston speed region), the disk valve 23 opens to allow the hydraulic fluid in the cylinder lower chamber 2b to flow directly into the cylinder upper chamber 2a through the compression hydraulic fluid passage 10.

Thus, damping force can be controlled directly by controlling the valve opening pressure of the pressure control valve 31, that is, by varying the electric current supplied to the proportional solenoid actuator. At this time, because the pressure on the upstream side of the compression pressure control valve 31 is transmitted to the pilot chamber 26 through the passage 33 and the orifice groove 34, the valve opening pressure of the disk valve 23 can also be controlled at the same time as the valve opening pressure of the pressure control valve 31 is controlled. Thus, damping forces in the low and high piston speed regions can be controlled simultaneously.

During each of the extension and compression strokes, the pressure transmitted from a portion of the sub-passage to the pilot chamber, that is, from the hydraulic fluid chamber 20 (32) to the pilot chamber 14 (26), is restricted by the orifice groove 22 (34). Therefore, it is possible to make the pilot chamber 14 (26) less responsive to a sharp pressure change in the sub-passage. Consequently, a sharp pressure change occurring in the vicinity of the piston 3 when the direction of the stroke of the piston rod 8 changes cannot readily be transmitted to the pilot chamber 14 (26). Accordingly, it is possible to suppress an abrupt change in damping force due to the pressure change and hence possible to obtain stable damping force at all times.

A time constant τ concerning the delay in response caused by the orifice groove 22 (34) is expressed by $$\tau = C/(Kv/V)$$

where:
V: the volumetric capacity of the pilot chamber
Kv: the bulk modulus of the pilot chamber
C: a value obtained by linearly approximating a coefficient of differential pressure with respect to the flow rate in the orifice passage It will be understood from the above expression that as the restriction of the orifice groove 22 (34) is increased (i.e. the value of C is increased), the time constant τ increases, and the influence of pressure change weakens.

Although a damping force control type hydraulic shock absorber using pressure control valves as regulating valves has been described in the foregoing embodiment by way of example, it should be noted that the present invention is not necessarily limited to the described embodiment. The present invention is also applicable to a damping force control type hydraulic shock absorber in which flow control valves, e.g. spool valves, are used as regulating valves.

Further, the damping force control type hydraulic shock absorber shown in the foregoing embodiment is of the type in which a pilot-operated damping valve and so forth are incorporated in a piston and piston rod assembly. However, the present invention is not necessarily limited to the described embodiment. The present invention is also applicable to a damping force control type hydraulic shock absorber in which upper and lower chambers defined in a cylinder by a piston are communicated with each other by a bypass passage provided outside the cylinder and a pilot-operated damping valve and so forth are provided in the bypass passage.

As has been detailed above, the damping force control type hydraulic shock absorber according to the present invention has a restrictor provided in a pilot passage for supplying a pilot pressure to a pilot chamber of a pilot-operated damping valve from a sub-passage. Consequently, it becomes unlikely that a sharp change in the pressure of hydraulic fluid in the cylinder when the stroke direction of the piston rod changes will be transmitted to the pilot chamber. Accordingly, it is possible to suppress an abrupt change in damping force due to the pressure change and hence possible to obtain stable damping force at all times.

It should be noted that the present invention is not necessarily limited to the foregoing embodiments but can be modified in a variety of ways without departing from the gist of the present invention.

What is claimed is:

1. A damping force control type hydraulic shock absorber comprising:
    a cylinder having a hydraulic fluid sealed therein;
    a piston slidably fitted in said cylinder to divide an inside of said cylinder into two chambers;
    a piston rod connected at one end thereof to said piston, the other end of said piston rod extending to the outside of said cylinder;
    a main passage and a sub-passage for allowing the hydraulic fluid to flow between said two chambers in response to sliding movement of said piston; a pilot-operated damping valve for generating damping force by controlling flow of the hydraulic fluid in said main passage, said pilot-operated damping valve including a valve member and a pilot chamber provided such that the pressure of the hydraulic fluid in the pilot chamber urges the valve member to the valve closing position;
    a fixed orifice provided in said sub-passage;
    a regulating valve provided in said sub-passage at a position downstream of said fixed orifice;
    a pilot passage for allowing a portion of said sub-passage between said fixed orifice and said regulating valve to communicate with said pilot chamber; and
    a restrictor provided in said pilot passage,
    wherein a portion of said pilot passage is defined by said valve member and a piston rod assembly comprising said piston rod and a piston bolt for securing said piston to said piston rod.

2. A damping force control type hydraulic shock absorber according to claim 1, wherein said portion of said pilot passage is formed by a recess provided on an outer periphery of said piston rod assembly.

3. A damping force control type hydraulic shock absorber according to claim 2, wherein said recess is formed by cutting said piston rod assembly.

4. A damping force control type hydraulic shock absorber comprising:
    a cylinder having a hydraulic fluid sealed therein;
    a piston slidably fitted in said cylinder to divide an inside of said cylinder into a first chamber and a second chamber;
    a piston rod assembly including a piston rod and a piston bolt for securing said piston to said piston rod at one end of the piston rod, the other end of said piston rod extending to the outside of said cylinder, said piston bolt having an axial bore;
    a main passage including a fluid passage formed in said piston so as to communicate said first and second chambers;
    a pilot-operated damping valve for generating damping force by controlling flow of the hydraulic fluid in said main passage, said damping valve comprising:
        a valve member secured to said piston on one side thereof so that the valve member is subjected to the pressure of the hydraulic fluid which flows through said main passage from said first chamber to said second chamber,
        a fixed member secured to said piston bolt on the side of said valve member remote from said piston, and
        means provided on said fixed member so that a pilot chamber is formed between said valve member and said fixed member;
    a sub-passage bypassing said pilot operated damping valve, a portion of said sub-passage being formed by a first passage formed in said piston and functioning as a fixed orifice and a second passage formed in said piston bolt so as to communicate said first passage with said axial bore of the piston bolt;
    a regulating valve provided in said axial bore of said piston bolt;
    a pilot passage for allowing a portion of said sub-passage between said fixed orifice and said regulating valve to communicate with said pilot chamber; and
    a restrictor formed in said fixed member so as to provide a restriction to the flow in said pilot passage.

5. A damping force control type hydraulic shock absorber according to claim 4, wherein a portion of said pilot passage is provided by a recess formed in said piston bolt so as to axially extend across said valve member.

6. A damping force control type hydraulic shock absorber according to claim 4, wherein said restrictor comprises a groove.

7. A damping force control type hydraulic shock absorber according to claim 4, wherein said means provided on said fixed member comprises a movable member slidably supported on said fixed member and biased to engage with said valve member.

* * * * *